March 7, 1967     H. LOWENTHAL     3,307,598
REFILLING OF GAS BURNING CIGARETTE LIGHTERS
Filed Aug. 12, 1964

Inventor
HANS LOWENTHAL
By
Holcombe, Wetherill & Brisebois
Attorneys

United States Patent Office 3,307,598
Patented Mar. 7, 1967

3,307,598
REFILLING OF GAS BURNING CIGARETTE LIGHTERS
Hans Lowenthal, Kensington, London, England, assignor to Colibri Lighters Limited, London, England, a British company
Filed Aug. 12, 1964, Ser. No. 389,137
Claims priority, application Great Britain, Aug. 29, 1963, 34,231/63
5 Claims. (Cl. 141—311)

There are two common kinds of gas refill cartridge used for refilling the gas reservoirs of gas burning cigarette lighters. One kind has an externally screw threaded neck which is arranged to fit in a screw threaded socket in the lighter reservoir and contains a spring loaded outlet valve which is opened to allow the gas to flow out by a pintle within the socket in the lighter as the neck is screwed into this socket. The second kind also has a neck which is arranged to fit into a socket in the lighter reservoir, but this neck instead of being closed by a spring loaded valve, is closed by a piece of rubber or like material which is pierced by a hollow piercing pin within the socket of the lighter reservoir as the neck is inserted into this socket to allow the gas to flow from the cartridge and this piece of rubber is self sealing so that it closes up again when the neck is removed from the socket in the lighter reservoir after filling.

It may sometimes be desired to be able to fill a lighter reservoir having a socket intended to receive the neck of a refill cartridge of the second kind with a refill cartridge of the first kind. This would happen, if for example, one person owned two different lighters intended to be filled from the cartridges of the two different kinds.

The present invention is concerned with an adaptor for fitting to a gas refill cartridge of the first kind to enable it to be used to fill a lighter which is intended to be filled from a gas refill cartridge of the second kind.

According to this invention, such an adaptor comprises a single component forming a screw threaded socket for receiving the neck of the cartridge of the first kind, a tubular stem having one end communicating with the socket and the other end open and a pintle within the socket for holding the valve in the neck of the cartridge of the first kind open whilst the neck is screwed into the socket, and the open end of the stem being sealed by a piece of self-sealing rubber or like material held in position by a sleeve which extends around the stem. The sealed tubular stem is formed of a similar shape to the neck of a cartridge of the second kind and is thus adapted to be inserted into the socket of the lighter with the needle in the lighter socket piercing the rubber seal.

Preferably, the single component is a moulding and the sleeve is formed by impact extrusion out of ductile metal such as aluminium. The sleeve may be a force fit on the stem or it may be held in position by means of a ridge on its inside surface which engages in a corresponding groove on the outside of the stem. Both the moulding, which is preferably made of nylon, and the impact extruded sleeve can be made extremely cheaply and the total cost of the whole adaptor is therefore extremely small.

The socket in the adaptor is preferably provided with a sealing washer to ensure that there is a tight seal between the socket and the neck of the cartridge of the first kind onto which it is screwed. The adaptor still then only consists of four separate parts, the moulding, the sleeve, the rubber seal and the sealing washer.

An example of an adaptor in accordance with the invention is illustrated in the accompanying drawings in which.

Figure 1:
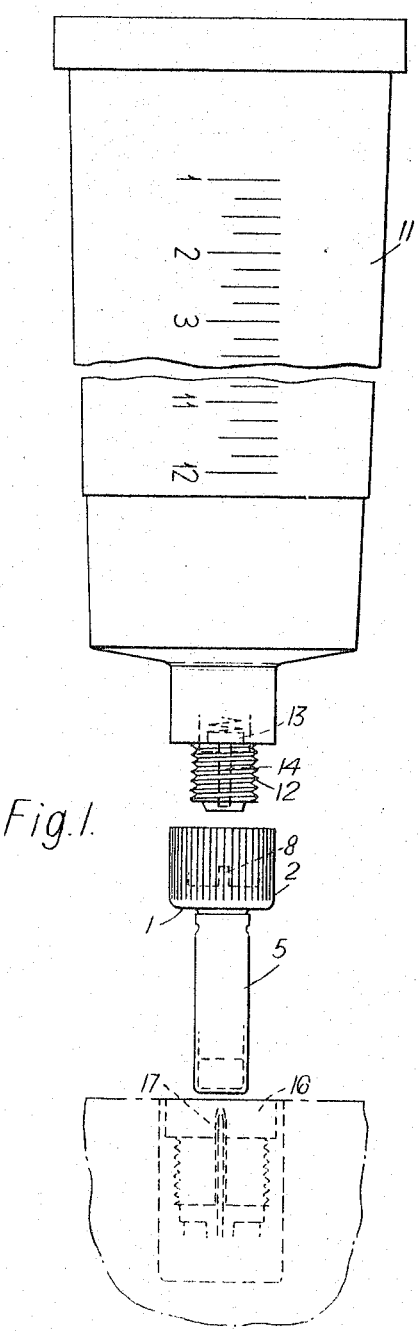
FIGURE 1 is a side elevation of the adaptor and of a cartridge of the first kind with the socket of a lighter into which the tubular stem of the adaptor will fit indicated in broken lines.

The adaptor comprises a moulding forming a screw-threaded socket 1 having a knurled outside surface 2 to enable it to be gripped firmly by the fingers and a tubular stem 3 extending coaxially from the socket 1. The open bottom end of the stem 3 is closed by a self-sealing rubber plug 4 which is held in position by an aluminium sleeve 5 which is made by impact extrusion and has an end portion 6 formed with an opening 7 at the centre of the rubber plug 4. In this example, the sleeve 5 is held in place on the stem 3 by the engagement of an internal ridge 5a on the sleeve in a corresponding groove in the stem, but alternatively the sleeve may just be a force fit over the stem.

At the centre of the socket 1, so that it is coaxial with the tubular stem 3, is a pintle 8 which is also moulded integrally with the socket and stem. A small bore 9 extends beside the pintle 8 from the bottom of the socket 1 into the inside of the tubular stem 3. This bore is offset from the centre line of the tubular stem 3 because of the pintle 8 and it registers around its outside half with a semi-circular groove 10 formed in the side wall of the stem 3.

Figure 2:
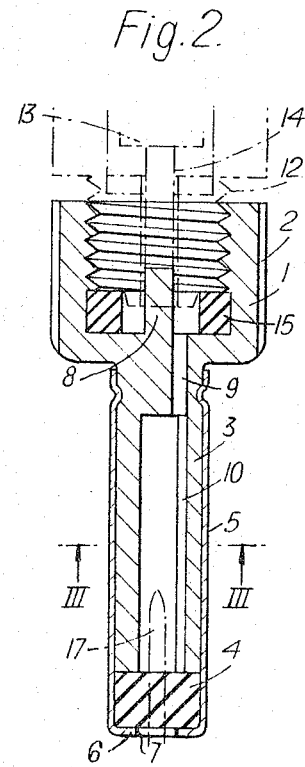
FIGURE 2 is a longitudinal section through the adaptor to a larger scale with a part of the neck of the cartridge and of the needle in the lighter socket indicated in broken lines; and, FIGURE 3 is a section through the adaptor as seen in the direction of the arrows on the line III—III in FIGURE 2.
Figure 3:
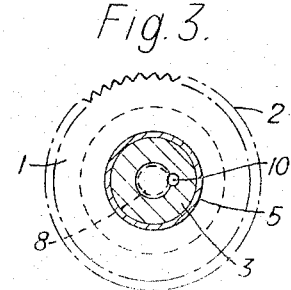

A gas refill cartridge 11 has a screw-threaded neck 12 and this neck includes a spring loaded outlet valve 13 having a stem 14 which extends through the neck 12. When the adaptor is screwed into position on the neck 12, as shown most clearly in FIGURE 2 of the drawings, the pintle 8 comes into engagement with the stem 14 and, as the adaptor is screwed fully home, opens the valve 13. Gas can therefore flow from the cartridge through the clearance within the neck 12 around the stem 14 into the socket 1. The screw-threaded joint between the socket 1 and the neck 12 is sealed by a rubber washer 15 which forms a part of the adaptor. Thence the gas flows through the bore 9, and into the tubular stem 3.

The cigarette lighter which is enabled to be refilled from the cartridge 11 by means of the adaptor has an inlet socket 16 fitted with a hollow tubular needle 17. As the stem 3 is pushed into the socket 16, the needle 17 pierces the rubber plug 4 and arrives in the position shown in FIGURE 2. The gas can then flow through the hollow tubular needle 17 into the reservoir until this is sufficiently full. On withdrawal of the stem 3, the needle 17 is withdrawn from the rubber plug 4 and this, being self sealing, again seals the outlet from the stem 3.

I claim:
1. An adaptor for fitting to a gas refill cartridge of the type provided with a screw-threaded neck together with a resiliently biassed valve member and adapted to fill a first type of lighter equipped with means for exerting pressure against said valve member, so as to open said cartridge and permit it to fill a lighter of a second type equipped with a piercing member for piercing a resilient self-sealing closure member, said adaptor comprising an internally screw-threaded socket for matingly receiving said neck, a tubular stem extending from said socket and formed with a central bore communicating with the interior of said socket, a pin in said socket positioned to exert pressure against said valve member when said socket is screwed onto said neck, and a self sealing closure member closing the bore in said stem and positioned to be pierced by the piercing pin of a lighter of said second type.

2. An adaptor as claimed in claim 1, wherein said tubular stem and said socket are coaxial, and internal wall portions of said tubular stem define a longitudinal semi-circular groove in said stem, said groove registering with said bore and providing said communication between said socket and said bore.

3. An adaptor as claimed in claim 1 in which said socket and stem are integral and comprising a sleeve encircling said stem and holding said closure member in position on the end of said stem remote from said socket.

4. An adaptor as claimed in claim 3, wherein peripheral surface portions of said stem define a groove and further comprising an inwardly projecting ridge on the inside surface of said sleeve, said ridge engaging in said groove to hold said sleeve in position on said stem.

5. An adaptor as claimed in claim 1, further comprising a sealing washer in said socket, said sealing washer engaging in gas tight relation with the end of the neck of the cartridge when said neck is screwed into said socket.

References Cited by the Examiner
UNITED STATES PATENTS 2,728,509   12/1955   Peterson _____ 67—7.1 X

FOREIGN PATENTS 1,128,281   8/1956   France.
932,232    8/1955   Germany.

LAVERNE D. GEIGER, *Primary Examiner.*

H. S. BELL, *Assistant Examiner.*